United States Patent [19]

Wolfe

[11] Patent Number: 4,853,254

[45] Date of Patent: Aug. 1, 1989

[54] PROCESS FOR BINDING PIGMENT PARTICLES TO PHOSPHOR PARTICLES

[75] Inventor: Robert W. Wolfe, Towanda, Pa.

[73] Assignee: GTE Products Corporation, Stamford, Conn.

[21] Appl. No.: 141,739

[22] Filed: Jan. 11, 1988

[51] Int. Cl.$^4$ .............................................. B05D 5/06
[52] U.S. Cl. ......................................... 427/64; 427/68
[58] Field of Search ...................... 427/64, 68, 213.32, 427/213.36

[56] References Cited

U.S. PATENT DOCUMENTS 4,206,250  6/1980  Oba et al. .............................. 427/64
4,219,587  8/1980  Oba et al. .............................. 427/64

Primary Examiner—Janyce Bell
Attorney, Agent, or Firm—Donald R. Castle; L. Rita Quatrini

[57] ABSTRACT

A process is disclosed for binding pigment particles to phosphor particles which involves forming an aqueous slurry of phosphor particles, pigment particles, and a binding agent which can be latex polymers or copolymers, the binding agent having a glass transition temperature of greater than about 20° C. and agitating the slurry, separating the solids from the resulting liquor, and drying the solids at a temperature above the Minimum Film Formation Temperature of the latex to produce the phosphor particles wherein the pigment particles are bonded to them.

1 Claim, No Drawings

PROCESS FOR BINDING PIGMENT PARTICLES TO PHOSPHOR PARTICLES

BACKGROUND OF THE INVENTION

This invention relates to a process for binding pigment particles to phosphor particles using polymers or copolymers applied as latices while the pigment and phosphor particles are in aqueous suspension. More particularly, the binding agents are latex polymers with a glass transition temperature of greater than about 20° C. These polymer binders produce tack-free, nonblocking, free flowing, pigmented phosphor powders.

Many methods of binding pigment particles to phosphor particles are described in the literature. These materials are primarily used in cathode ray tubes where the pigment acts as a filter to improve the color purity and contrast of the emitted light. Both organic and inorganic pigment binders are used in the industry. U.S. Pat. No. 4,473,634 describes an inorganic binder system which uses water glass (potassium silicate) as the binder. Organic binder systems such as gelatin, described in U.S. Pat. No. 3,275,466 and various organic polymers, applied as latices, as described in U.S. Pat. No. 4,049,845, have also proved useful to the industry. However, the method as taught in U.S. Pat. No. 4,049,845 utilizes latex polymers that show a glass transition temperature, Tg, well below room temperature. These polymers are therefore rather soft and sticky and result in pigmented phosphor powders which are not free flowing and which aggregate easily. As a result, these powders are rather difficult to screen through a dry seive, which is the normal method used to ensure that the pigmented phosphor powder is deagglomerated. The seiving step is usually the final step in the manufacture of the product. Also, there is a tendency for the pigmented phosphor powder to re-aggregate after screening due to the stickiness or "tackiness" of the polymer binder. U.S. Pat. No. 4,049,845 discusses this problem and methods to reduce tackiness are discussed, including further processing steps such as application of inorganic and organic cross-linking agents. Such steps add to the complexity of the process and may not be effective. Phosphors prepared according to U.S. Pat. No. 4,049,845 undergo so much reagglomeration that it is necessary to wet ball mill these materials in the application slurry prior to their application to the cathode ray tube faceplate. If such a deagglomeration step were not used, the phosphor coating would be grainy and unacceptable. It is desirable to eliminate the wet ball milling step prior to the application of the phosphor to reduce handling which may degrade the phosphor and to reduce expense.

Therefore, a method of coating phosphors with pigment which would eliminate the problems associated with tacky polymer binders, such as poor dry screenability and lumping or agglomeration subsequent to screening would be an advancement in the art. Such improved phosphors would not require milling the phosphor slurry prior to use in the application. Such phosphors are known in the art as "no-mill" or "stir-in" phosphors.

SUMMARY OF THE INVENTION

In accordance with one aspect of the invention, there is provided a process for binding pigment particles to phosphor particles which involves forming an aqueous slurry of phosphor particles, pigment particles, and a binding agent which can be latex polymers or copolymers, the binding agent having a glass transition temperature of greater than about 20° C. and agitating the slurry, separating the solids from the resulting liquor, and drying the solids at a temperature above the Minimum Film Formation Temperature of the latex to produce the phosphor particles wherein the pigment particles are bonded to them.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

It has been discovered that organic polymer latices of varying compositions but with glass transition temperatures above room temperature can be used to adhere pigment particles to phosphor particles. Such latex polymers can be easily and inexpensively applied, do not require additional processing to reduce tackiness of the binder, and are suitable for manufacturing pigmented "no-mill" or "stir-in" phosphors.

Some preferred phosphor and pigment combinations which are particularly suited to the practice of the present invention are zinc sulfide phosphors such as silver activated zinc sulfide phosphors with blue pigment cobalt aluminate, and yttrium oxysulfide phosphors such as europium activated yttrium oxysulfide phosphors with the red pigment ferric oxide.

Typically, the pigment makes up from about 0.1% to about 2.5% by weight of the phosphor and the binder makes up from about 0.05% to about 0.5% by weight of the phosphor.

It is preferable that the average phosphor particle size be in the range of from about 4 to about 15 micrometers in diameter, and that the average particle size of the pigment particles be from about 0.1 to about 1.0 micrometers in diameter.

The binding agent is a latex polymer or copolymer. A latex is herein defined as an aqueous colloidal suspension of an organic polymer or copolymer. It is critical that the binding agent have a glass transition temperature of greater than about 20° C. for the reasons given previously. By glass transition temperature is meant a temperature at which amorphous polymeric materials undergo a marked change in properties associated with a cessation of molecular motion of a local scale. Below the glass transition temperature, polymeric materials behave as hard, brittle and stiff solids. Above Tg, amophorous polymer materials behave as viscous, plastic solids. Some examples of these types of binders (1) an acrylic polymer manufactured by B.F. Goodrich under the name of Hycar 2600X256 which has a Tg of +45° C., (2) a polystyrene latex manufactured by Reichold under the name of Tylac 68-157 which has a Tg of +100° C., and (3) a carboxylated acrylate acrylonitrile copolymer manufactured by Reichold under the name of Synthemul which has a Tg of +20° C.

An aqueous slurry is first formed of the phosphor particles to be coated, the pigment particles, and the binding agent. This is done preferably by forming an aqueous slurry of the phosphor and pigment. The usual practice is to form a slurry of the phosphor and to deagglomerate the pigment and form another aqueous slurry of the pigment and combine these two slurries into one. The binding agent which is a latex is then added. The colloidal particles have a particle size typically of from about 0.05 to about 2.0 micrometers in diameter. The resulting phosphor-pigment-binder slurry is agitated so that colloidal polymer of copolymer particles bind the pigment particles to the phosphor particles.

After a period of agitation of typically but not necessarily about one-half hour, the resulting solids which are the phosphor with the pigment bonded to it by the binding agent are separated from the resulting liquor by standard techniques. This is done usually by allowing the solids to settle out and thereafter decanting off the liquor.

It is preferable to wash the solids with deionized water one or more times to remove the water soluble impurities such as dispersing agents which are added by the manufacturer to stabilize the latex.

The solids are then dried at a temperature above the MFT of the latex for about 8 hours. The MFT or Minimum Film Formation Temperature is the minimum temperature at which a latex will dry out to form a continuous, nonporous film. Drying is done usually at a temperature of at least about 110° C. Most typically, the drying temperature is from about 130° C. to about 150° C.

After the resulting dried phosphor is cooled, it can be screened to remove out of size material, and it is then ready for use in the application.

To more fully illustrate this invention, the following nonlimiting examples are presented.

EXAMPLE 1

About 1 kilogram of ZnS:Ag phosphor is slurried in about 4 liters of deionized water. About 1.5% of the weight of the phosphor or about 15 grams of the blue pigment $CoAl_2O_4$ is deagglomerated by dispersing it into about 250 ml of deionized water using an ultrasonic probe. The pigment slurry is then added to the stirred phosphor dispension. Finally 0.25% by weight or about 2.5 grams of a commercial latex manufactured by B.F. Goodrich is added to the stirred phosphor and pigment slurry. The latex is Hycar 2600X256, an acrylic copolymer which has a Tg of +45° C. and an MFT of about 42° C. The resulting phosphor-pigment-copolymer slurry is then agitated for about ten minutes and the solids are then allowed to settle out. Two cold deionized water washes of about 4 liters each are done by slurrying the phosphor for a few minutes, letting the solids settle and and decanting. The solids are then put into a tray and dried at about 130° C. for about 8 hours. After cooling, the phosphor is seived and is ready for use in the application.

EXAMPLE 2

About 1 kilogram of $Y_2O_2S:Eu$ cathode ray phosphor is slurried into about 4 liters of deionized water. About 0.15% by weight of the phosphor of red pigment $Fe_2O_3$ or about 1.5 grams is dispersed in about 250 ml of deionized water by use of an ultrasonic probe. The pigment is then added to the phosphor slurry and about 0.10% by weight of the phosphor or about 1.0 gram of a commercial latex manufactured by Reichold is added to the slurry of the pigment and phosphor. The latex is Tylac 68-157, a polystyrene polymer having a Tg of +100° C. and an MFT of +40° C. After the resulting slurry of pigment, phosphor and polymer is agitated for a few minutes, the solids are allowed to settle out. The pigmented phosphor is then washed as in Example 1 and dried at about 130° C. for about 16 hours. After cooling, the phosphor is classified by seiving to remove out of size material and then is ready for use in the application.

EXAMPLE 3

About 1 kilogram of ZnS:Ag cathode ray phosphor and about 1.5 grams of blue pigment $CoAl_2O_4$ are slurried as in Example 1. This time about 0.20% by weight or about 2.0 grams of a latex manufactured by Reichold is added to the slurry. The latex is Synthemul DL-0685, a carboxylated acrylate acrylonitride copolymer. The Tg for this copolymer is +20° C. and the MFT is +40° C. The pigmented phosphor is washed, dried, and screened as in Example 1 and is ready for use in the application.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for binding pigment particles to phosphor particles, said process consisting essentially of
   (a) forming an aqueous slurry consisting essentially of said phosphor particles, said pigment particles, and a binding agent selected from the group consisting of latex polymers and latex copolymers, said binding agent having a glass transition temperature of greater than about 20° C. and a minimum film formation temperature, and agitating said slurry;
   (b) separating the solids from the resulting liquor; and
   (c) drying said solids at a temperature above the Minimum Film Formation Temperature of said latex to produce the phosphor particles wherein said pigment particles are bonded to said phosphor particles.

* * * * *